(12) United States Patent
Wu (10) Patent No.: US 11,150,949 B2
(45) Date of Patent: Oct. 19, 2021

(54) RESOURCE RELEASE METHOD, RESOURCE ALLOCATION METHOD, DEVICES, AND COMPUTER PROGRAM PRODUCTS

(71) Applicant: EMC IP Holding Company LLC, Hopkinton, MA (US)

(72) Inventor: Xin Wu, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 58 days.

(21) Appl. No.: 16/273,343

(22) Filed: Feb. 12, 2019

(65) Prior Publication Data
US 2019/0324814 A1 Oct. 24, 2019

(30) Foreign Application Priority Data
Apr. 20, 2018 (CN) .......................... 201810361952.4

(51) Int. Cl.
*G06F 9/46* (2006.01)
*G06F 9/50* (2006.01)
*G06F 3/06* (2006.01)
*H04L 29/08* (2006.01)
*G06F 12/02* (2006.01)
*G06F 8/654* (2018.01)

(52) U.S. Cl.
CPC .......... *G06F 9/5022* (2013.01); *G06F 3/0607* (2013.01); *G06F 3/067* (2013.01); *G06F 3/0631* (2013.01); *G06F 9/5016* (2013.01); *G06F 8/654* (2018.02); *G06F 9/505* (2013.01); *G06F 9/5011* (2013.01); *G06F 12/0284* (2013.01); *G06F 2209/5021* (2013.01); *H04L 67/1002* (2013.01)

(58) Field of Classification Search
CPC ...... G06F 8/654; G06F 9/5066; G06F 9/5038; G06F 9/5077; G06F 3/0647; G06F 9/5022; G06F 9/542; G06F 3/0608; G06F 12/0284; G06F 9/5016; G06F 3/0607; G06F 3/0631; G06F 3/067; G06F 2009/5021; G06F 9/5011; G06F 9/505; G06F 9/52; H04L 67/1002
See application file for complete search history.

(56) References Cited

U.S. PATENT DOCUMENTS

5,682,530 A * 10/1997 Shimamura ............... G06F 9/52
  711/165
7,111,298 B1 9/2006 Michael et al.
(Continued)

*Primary Examiner* — Tuan A Vu
(74) *Attorney, Agent, or Firm* — BainwoodHuang (57) ABSTRACT

Techniques release and/or allocate resources. Such techniques involve obtaining information related to low-usage-rate-resources, the information indicating resources of a set of resources in a storage system having usage rates lower than a threshold. Such techniques further involve receiving a request for resource release, the request comprising the number of resources to be released. Such techniques further involve determining, based on the number of resources to be released, the number of low-usage-rate-resources to be released. Via such techniques, not only the time and computing overheads for checking each resource that are needed in resource release may be reduced, but also the amount of data needed to be moved in resource release may be reduced.

9 Claims, 6 Drawing Sheets

(56) References Cited

U.S. PATENT DOCUMENTS

| | | | |
|---|---|---|---|
| 8,527,454 B2 | 9/2013 | Oza | |
| 9,110,790 B1 | 8/2015 | Joyce et al. | |
| 9,229,854 B1* | 1/2016 | Kuzmin | G06F 11/1072 |
| 9,547,590 B2 | 1/2017 | Liao | |
| 10,635,594 B1 | 4/2020 | Wallace et al. | |
| 2003/0056076 A1* | 3/2003 | Cook | G06F 12/0284 |
| | | | 711/173 |
| 2007/0055704 A1* | 3/2007 | Watanabe | G06F 3/067 |
| 2007/0271419 A1* | 11/2007 | Yasukaga | G06F 12/0284 |
| | | | 711/147 |
| 2012/0131573 A1* | 5/2012 | Dasari | G06F 9/5077 |
| | | | 718/1 |
| 2012/0239952 A1* | 9/2012 | Nishiguchi | G06F 1/3287 |
| | | | 713/320 |
| 2013/0332942 A1* | 12/2013 | Ramesh | G06F 9/542 |
| | | | 719/318 |
| 2014/0108658 A1* | 4/2014 | Echigo | H04L 67/1002 |
| | | | 709/226 |
| 2014/0192074 A1* | 7/2014 | Pronovost | G06F 9/5022 |
| | | | 345/535 |
| 2014/0208055 A1* | 7/2014 | Dawson | G06F 3/0608 |
| | | | 711/171 |
| 2014/0250439 A1* | 9/2014 | Parashar | G06F 9/505 |
| | | | 718/104 |
| 2016/0140001 A1* | 5/2016 | Kulkarni | G06F 9/5066 |
| | | | 714/4.12 |
| 2017/0004013 A1* | 1/2017 | Zhang | G06F 9/5011 |
| 2017/0155594 A1* | 6/2017 | Cook | G06F 9/5038 |
| 2018/0267832 A1* | 9/2018 | Biener | G06F 9/5077 |
| 2019/0042106 A1* | 2/2019 | Klein | G06F 3/0647 |

\* cited by examiner

RESOURCE RELEASE METHOD, RESOURCE ALLOCATION METHOD, DEVICES, AND COMPUTER PROGRAM PRODUCTS

FIELD

Embodiments of the present disclosure generally relate to the field of data storage, and more specifically, to a resource release method, a resource allocation method, devices, and computer program products.

BACKGROUND

A storage system usually includes a mapped logical unit (MLU), a common block device file system (CBFS) and multiple slices, among which the mapped logical unit may control release and allocation of a slice. A slice may be a storage resource for data writes and reads, and releasing a slice may refer to reclaiming the slice.

A slice in a storage system may have data stored therein, and data amounts stored in different slices may differ. When releasing a certain slice in a storage system, data stored in the slice needs to be moved into other slices. Therefore, when releasing a slice in a storage system, usually a slice with the least amount of stored data will be selected to release, such that the amount of moved data is minimized. To this end, every time a slice needs to be released, the storage system will check each slice in the storage system and select one or more slices with the least amount(s) of stored data from all slices according to the number of slices to be released. Since every time the storage system releases a slice, the storage system has to check each slice, greater operation overheads and higher latency will be caused when releasing the slice, thereby affecting the user experience.

SUMMARY

Embodiments of the present disclosure provide resource release method, resource allocation method, devices, and computer program products.

In a first aspect of the present disclosure, provided is a resource release method. The method includes: obtaining information related to low-usage-rate-resources, the information indicating resources of a set of resources in a storage system having usage rates lower than a threshold; receiving a request for resource release, the request including the number of resources to be released; and determining, based on the number of resources to be released, the number of low-usage-rate-resources to be released.

In a second aspect of the present disclosure, provided is a resource allocation method. The method includes: obtaining information related to low-usage-rate-resources, the information indicating resources of a set of resources in a storage system having usage rates lower than a threshold; receiving a use request for a resource in the set of resources; and directing the use request to a resource in the set of resources other than the low-usage-rate-resources.

In a third aspect of the present disclosure, provided is a resource release device. The device includes: at least one processing unit; and at least one memory coupled to the at least one processing unit and storing instructions to be executed by the at least one processing unit, the instructions, when being executed by the at least one processing unit, causing the device to perform acts including: obtaining information related to low-usage-rate-resources, the information indicating resources of a set of resources in a storage system having usage rates lower than a threshold; receiving a request for resource release, the request including the number of resources to be released; and determining, based on the number of resources to be released, the number of low-usage-rate-resources to be released.

In a fourth aspect of the present disclosure, provided is a resource allocation device. The device includes: at least one processing unit; and at least one memory coupled to the at least one processing unit and storing instructions to be executed by the at least one processing unit, the instructions, when being executed by the at least one processing unit, causing the device to perform acts including: obtaining information related to low-usage-rate-resources, the information indicating resources of a set of resources in a storage system having usage rates lower than a threshold; receiving a use request for a resource in the set of resources; and directing the use request to a resource in the set of resources other than the low-usage-rate-resources.

In a fifth aspect of the present disclosure, provided is a computer program product. The computer program product is tangibly stored on a non-transient computer readable medium and includes machine executable instructions which, when being executed, causing a machine to perform any step of a method according to the first aspect of the present disclosure.

In a sixth aspect of the present disclosure, provided is a computer program product. The computer program product is tangibly stored on a non-transient computer readable medium and includes machine executable instructions which, when being executed, causing a machine to perform any step of a method according to the second aspect of the present disclosure.

This Summary is provided to introduce a selection of concepts in a simplified form that will be further described below in the Detailed Description. This Summary is not intended to identify key features or essential features of the present disclosure, nor is it intended to be used to limit the scope of the present disclosure.

BRIEF DESCRIPTION OF THE DRAWINGS

Through the more detailed description of example embodiments of the present disclosure with reference to the accompanying drawings, the above and other objects, features, and advantages of the present disclosure will become more apparent, wherein the same reference numerals typically represent the same components in the example embodiments of the present disclosure.

Throughout the figures, the same or corresponding numerals denote the same or corresponding parts.

DETAILED DESCRIPTION OF EMBODIMENTS

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Some preferable embodiments will be described in more detail with reference to the accompanying drawings. Although the preferable embodiments of the present disclosure have been illustrated, however, it should be understood that the present disclosure can be implemented in various manners, and thus should not be construed to be limited to embodiments disclosed herein. On the contrary, those embodiments are provided for the thorough and complete understanding of the present disclosure, and completely conveying the scope of the present disclosure to those skilled in the art.

The terms "comprise" and its variants used herein are to be read as open terms that mean "include, but is not limited to." Unless otherwise specified, the term "or" is to be read as "and/or." The term "based on" is to be read as "based at least in part on". The terms "one example embodiment" and "one embodiment" are to be read as "at least one embodiment." The term "another embodiment" is to be read as "at least one other embodiment." The terms "first," "second," and the like may refer to different or the same objects. Other definitions, explicit and implicit, might be included below.

Figure 1:
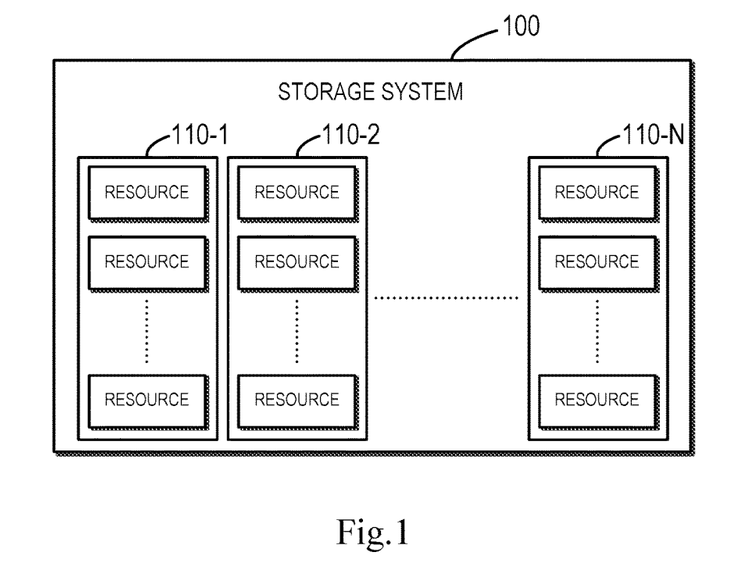
FIG. 1 shows a schematic view of a storage system 100 according to embodiments of the present disclosure.

FIG. 1 shows a schematic view of a storage system 100 according to embodiments of the present disclosure. As shown in FIG. 1, the storage system 100 includes N sets 110-1 to 110-N of resources, each of which includes multiple resources.

In the present disclosure, slices are taken as an example of storage resources while describing a resource release method, a resource allocation method, devices, and computer program products as recited in the present disclosure. It should be understood that resources as recited in the present disclosure are not limited to storage resources, but may include other resources that can be allocated and released, such as processing resources (e.g., a set of processors) or computing resources.

As described in the BACKGROUND, because every time the storage system releases a slice, the storage system has to check each slice, greater operation overheads and higher latency will be caused when releasing the slice, thereby affecting the user experience.

In traditional solutions, a slice release process mainly includes the following steps:

First of all, when a slice needs to be released, the mapped logical unit sends a slice marking request to the common block device file system, the request including the number (for example, n) of slices that should be released to the common block device file system.

After receiving the slice marking request, the common block device file system checks all slices in the storage system that are in use, these slices being initially identified as "normal" (e.g., SS-Normal). The common block device file system selects n slices with the least data amounts from all slices in the storage system that are in use, and identifies these selected slices as "marked" (e.g., SS_Marked).

Next, the mapped logical unit sends a slice release request to the common block device file system. After receiving the slice release request, the common block device file system identifies slices identified as "marked" as "data evacuating (e.g., SS_Evacuating)," and evacuates data stored in slices identified as "data evacuating" to slices identified as "normal."

Finally, after all data stored in slices identified as "data evacuating" are evacuated, these slices will be identified as "data evacuated." Subsequently, slices identified as "data evacuated" may be released to a storage pool as free storage resources.

As seen from the above steps, how to select candidate slices to be released and how much data are to be removed from the candidate slices are the key factors affecting the performance of slice release in the slice release process.

In the meantime, as seen from the above steps, four states as which a slice are identified (i.e., "normal," "marked," "data evacuating," and "data evacuated") are converted among them. In general, the four states may be described as below:

"Normal": Slices identified as "normal" state are in normal use, and a user can access these slices without any restriction.

"Marked": Slices identified as "marked" state are slices that are selected as candidate slices to be released. Data can only be read and written in allocated space of these slices. That is, no more data can be written to these slices at random.

"Data evacuating": Slices identified as "data evacuating" state are slices that are undergoing data evacuation, and data stored in these slices are being evacuated to slices identified as "normal" State. A user can only read data on these slices.

"Data evacuated": Slices identified as "data evacuated" state are slices where all stored data have been evacuated and which will be released. No read and write is allowed on these slices.

Figure 2:
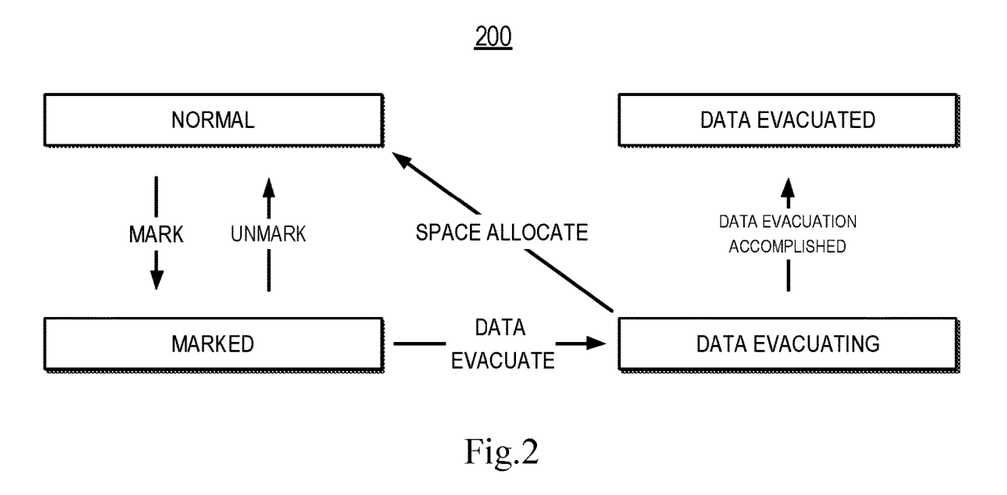
FIG. 2 shows a schematic view 200 of resource state conversion in a traditional solution.

Specifically, FIG. 2 shows a schematic view 200 of resource state conversion in the traditional solution.

For slices identified as "normal" state when there is a need for resource release, they may be identified as "marked" state, i.e., their states may be converted from "normal" to "marked." At the same time, when slices identified as "normal" state in the storage system are insufficient for input/output requests, slices identified as "marked" state may be restored to slices identified as "normal" state by unmarking, and slices identified as "data evacuating" slices may stop data evacuating through space allocation and be restored to slices identified as "normal" state, i.e., the "normal" state of a slice may be restored from "marked" state and "data evacuating" state.

For slices identified as "marked" state, they may be identified as "data evacuating" state by starting data evacuating, i.e., their states may be converted from "marked" to "data evacuating."

For slices identified as "data evacuating" state, they may be identified as "data evacuated" state after completing data evacuation, i.e., their states may be converted from "data evacuating" to "data evacuated."

For slices identified as "data evacuated" state, they can only wait to be released without being converted to other states.

Because the storage system in traditional solution will check all slices identified as "normal" state when identifying slices identified as "normal" state as "marked" state, and selects one or more slices with the least data amounts from the slices identified as "normal" state, a large quantity of system resources (e.g., processing capacity) will be consumed when checking all slices, Also, when writing data to slices identified as "normal" state, the storage system in the traditional solution does not take into consideration existing data amounts in these slices. Therefore, data might be stored in each slice identified as "normal" state, large volumes of data need to be evacuated during data evacuation, and system resources will be further consumed.

To at least partially overcome the above problems in the traditional solution, embodiments of the present disclosure provide a resource release and resource allocation solution. The solution aims to keep as little data as possible in as many slices as possible, such that during resource release, all data in a required number of slices can be evacuated by evacuating a small amount of data and further the amount of moved data can be reduced. To accomplish this objective, embodiments of the present disclosure introduce a new state, i.e., "unused (e.g., SS_Empty)" state for a slice in the storage system.

A slice in the "unused" state refers to a slice having a space usage rate (or data storage rate) that is zero. A slice in the "unused" state may result from performing resource deallocation on a slice in the "normal" state. Resource deallocation may be generated through snap deletion, file/file system truncation or hole punching.

Since embodiments of the present disclosure involve the "unused" state, resource state conversion includes more forms. Specifically, FIG. 3 shows a schematic view 300 of resource state conversion according to embodiments of the present disclosure.

Figure 3:
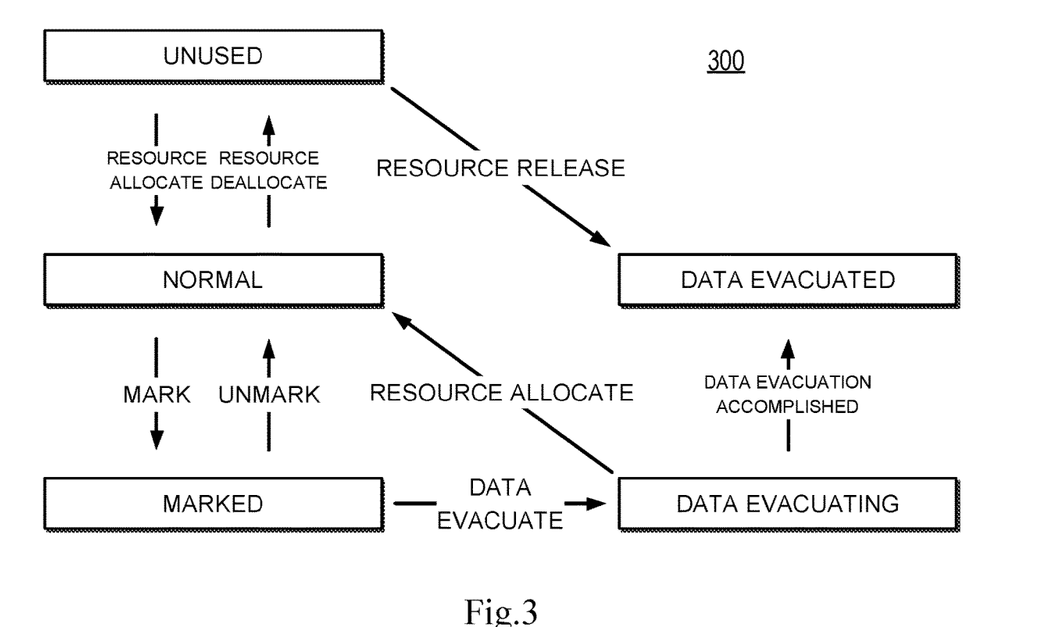
FIG. 3 shows a schematic view 300 of resource state conversion according to embodiments of the present disclosure.

As shown in FIG. 3, when slices identified as "marked" state and "data evacuating" state have no storage space that can be allocated, slices identified as "unused" state may be identified as "normal" state through resource allocation. At the same time, they may also be identified as "data evacuated" state through resource release. That is, their states may be converted from "unused" to "normal" or "data evacuated."

Accordingly, for slices identified as "normal" state, they may be identified as "unused" state through resource deallocation, i.e., their states may be converted from "normal" to "unused."

Other state conversion in FIG. 3 is the same as that in FIG. 2, and thus is not detailed here.

Figure 4:
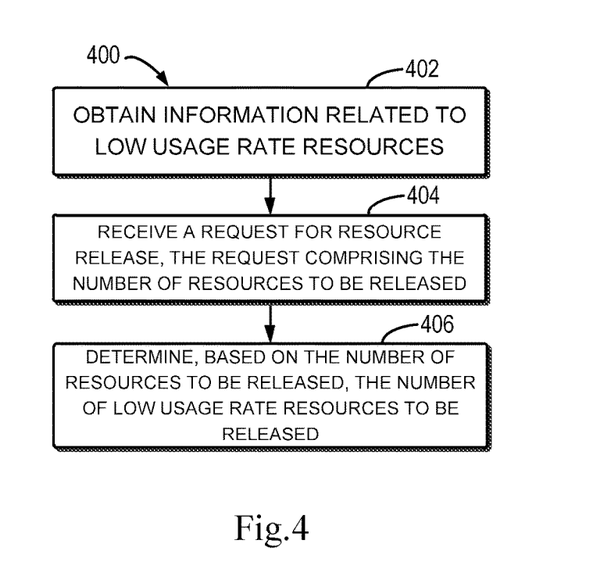
FIG. 4 shows a flowchart of a resource release method 400 according to embodiments of the present disclosure.
Figure 5:
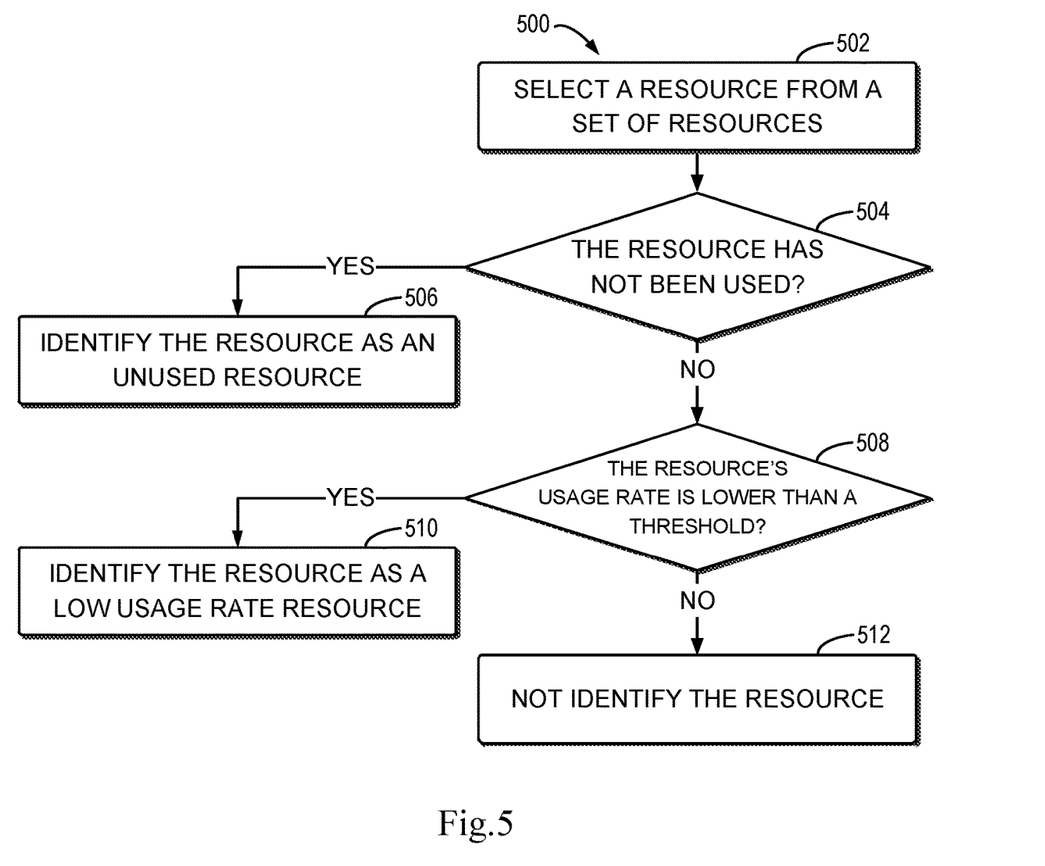
FIG. 5 shows a flowchart of a resource identifying method 500 according to embodiments of the present disclosure.
Figure 6:
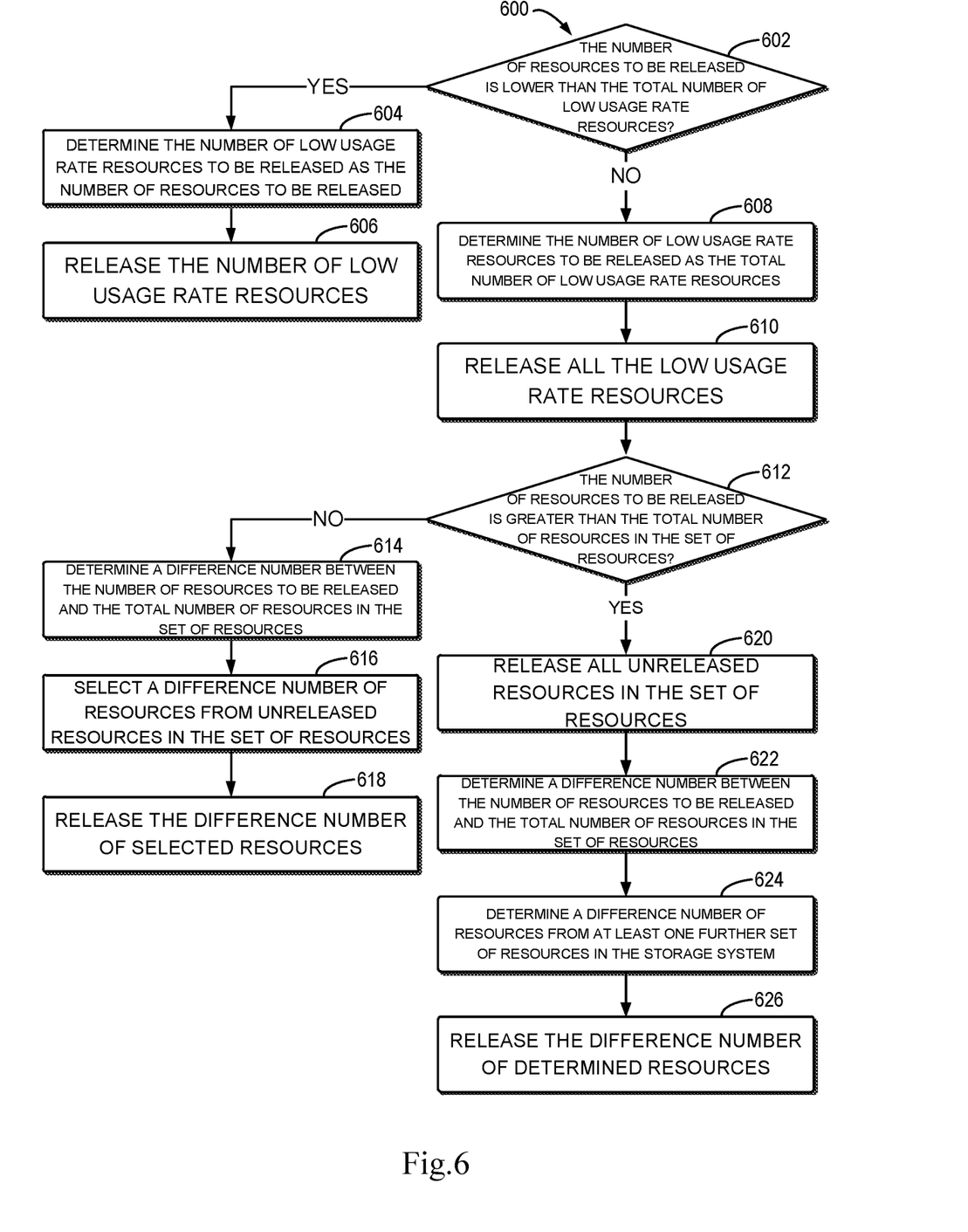
FIG. 6 shows a flowchart of a resource release method 600 according to other embodiments of the present disclosure.

Based on the above description of the storage system 100 and schematic view 300 of resource state conversion according to embodiments of the present disclosure with reference to FIGS. 1 and 3, a detailed description is presented below to concrete flows and operations of a resource release method 400, a resource identifying method 500 and a resource allocation method 600 according to embodiments of the present disclosure with reference to FIGS. 4 to 6. Specifically, FIGS. 4 to 6 are depicted with reference to the storage system 100 shown in FIG. 1, wherein the storage system 100 may include a mapped logical unit and a common block device file system. Since the implementation of embodiments of the present disclosure will not be affected no matter how the mapped logical unit and the common block device file system implement operations of identifying, evacuating and releasing, description below is only from the perspective of the storage system 100 with reference to FIGS. 4 to 6. It should be understood that flows and operations to be described below may further include additional steps and operations which are not shown and/or may omit steps and operations which are shown, and the scope of the present disclosure is not limited in this regard.

FIG. 4 shows a flowchart of the resource release method 400 according to embodiments of the present disclosure. It should be understood that the method 400 may further include additional steps and operations which are not shown and/or may omit steps and operations which are shown, and the scope of the present disclosure is not limited in this regard.

The method 400 starts at block 402 where the storage system 100 obtains information related to low-usage-rate-resources, the information indicating resources of a set of resources (e.g., the set of resources 110-1) in the storage system having usage rates lower than a threshold. According to embodiments of the present disclosure, the threshold may be set at random according to system needs, for example, may be set to 25%. The information may be provided in the form of a list, for example, may be named as List_Less_Data. It should be understood that the information in the form of a list is merely an example, and the information may take any data form that can indicate multiple resources.

Ways of generating the information may include: identifying, from the set of resources, resources having usage rates lower than the threshold as the low-usage-rate-resources; and generating the information based on the identified low-usage-rate-resources.

According to some embodiments of the present disclosure, the information may also separately indicate resources having usage rates that are zero (i.e., unused resources) and resources having usage rates greater than zero but lower than the threshold, and resources having usage rates greater than zero but lower than the threshold may be regarded as low-usage-rate-resources. In these embodiments, the information may still be provided in the form of a list. The information may indicate unused resources and low-usage-rate-resources in two portions of a single list, or may include two lists to separately indicate unused resources and low-usage-rate-resources. In the latter case, the two lists indicating unused resources and low-usage-rate-resources may be named as List_No_Data and List_Less_Data respectively.

According to some embodiments of the present disclosure, resources of a set of resources are identified as unused resources and low-usage-rate-resources in the form of the resource identifying method 500 as shown in FIG. 5.

FIG. 5 shows a flowchart of the resource identifying method 500 according to embodiments of the present disclosure. It should be understood that the method 500 may further include additional steps and operations which are not shown and/or may omit steps and operations which are shown, and the scope of the present disclosure is not limited in this regard.

The method 500 starts at block 502 where the storage system 100 selects a set of resources (e.g., the set of resources 110-1) for identification and selects a resource in the set of resources.

At block 504, the storage system 100 judges whether the resource has not been used (i.e., usage rate is zero). In response to the resource not being used, the operation process goes to block 506; otherwise, the operation process goes to block 508.

At block 506, since the resource has not been used, the storage system 100 identifies the resource as an unused resource.

At block 508, since the resource has been used, the storage system 100 judges whether a usage rate of the resource is lower than a threshold. In response to the usage rate of the resource being lower than the threshold, the operation process goes to block 510; otherwise, the operation process goes to block 512.

At block 510, since the usage rate of the resource is not zero and lower than the threshold, the storage system 100 identifies the resource as a low usage rate resource.

At block 512, since the usage rate of the resource is not lower than the threshold, the storage system 100 does not identify the resource. In this step, the resource may also be identified as a normal resource proactively or by default. According to some embodiments of the present disclosure, identifying the resource as an unused resource or a low usage rate resource includes adding the resource to corresponding lists or portions of the list. Since there is no need to build a separate list for normal resources, the resource may not be identified in this step but regarded by default as a normal resource other than an unused resource and a low usage rate resource.

The method 500 may be regarded as a refinement of the step 402 in the method 400. Since the storage system 100 may also obtain the information related to low-usage-rate-resources in other ways (e.g., provided by a third party), the steps of the method 500 may not be performed in some embodiments of the present disclosure.

Still with reference to FIG. 4, at block 404, the storage system 100 receives a request for resource release, the request including the number of resources to be released. According to embodiments of the present disclosure, the request is aimed at a specific set of resources in the storage system 100. Since the storage system 100 includes multiple sets of resources, the number of resources to be released included in the request may be greater than a total number of resources in the specific set of resources, i.e., resources might further be released from other sets of resources in the storage system 100. According to some embodiments of the present disclosure, the storage system 100 may also include only one set of resources. At this point, since the set of resources might include not only unused resources, the number of resources that can be released in the set of resources may be lower than the total number of resources in the set of resources considering that data evacuating is required. Therefore, it may be set that only a request including the number of resources to be released that is lower than the threshold number is accepted, or when a request including a too large number of resources to be released is received, a maximum number of resources that can be released are released.

At block 406, the storage system 100 determines, based on the number of resources to be released, the number of low-usage-rate-resources to be released. It should be understood that according to some embodiments of the present disclosure, when both unused resources and low-usage-rate-resources having usage rates that are not zero are taken into consideration, the priority of releasing unused resources may be set as higher than the priority of releasing low-usage-rate-resources having usage rates that are not zero.

According to some embodiments of the present disclosure, contents in block 406 of the method 400 as described with reference to FIG. 4 are further refined in the form of the resource release method 600 shown in FIG. 6. Specifically, FIG. 6 shows a flowchart of the resource release method 600 according to other embodiments of the present disclosure. It should be understood that the method 600 may further include additional steps and operations which are not shown and/or may omit steps and operations which are shown, and the scope of the present disclosure is not limited in this regard.

The method 600 starts at block 602 where the storage system 100 judges whether the number of resources to be released included in the received request is lower than the total number of the low-usage-rate-resources. In response to the number of resources to be released being lower than the total number of the low-usage-rate-resources, the operation process goes to block 604; otherwise, the operation process goes to block 608. It should be understood that according to some embodiments of the present disclosure, not only the priority of releasing unused resources may be set as higher than the priority of releasing low-usage-rate-resources having usage rates that are not zero, but also it may be judged whether the number of resources to be released is lower than the total number of unused resources. The step of data evacuating is not required when releasing unused resources, such that the system capacity and efficiency can be further improved.

At block 604, the storage system 100 determines the number of low-usage-rate-resources to be released as the number of resources to be released. Since the total number of low-usage-rate-resources is greater than the number of resources to be released, the request for resource release can be satisfied simply by releasing resources from low-usage-rate-resources.

At block 606, the storage system 100 releases low-usage-rate-resources in the number as determined in block 604. At this point, the storage system 100 transfers contents in a used portion of the determined low-usage-rate-resources to be released to resources other than the low-usage-rate-resources in the specific set of resources.

According to some embodiments of the present disclosure, the storage system may randomly determine low-usage-rate-resources to be released from low-usage-rate-resources, because resource usage rates of low-usage-rate-resources may be made smaller by adjusting the threshold, e.g., setting the threshold to 10%. At this point, no matter which low usage rate resource is released, a large amount of data will not be evacuated, and thus low-usage-rate-resources may be selected at random.

According to other embodiments of the present disclosure, since the data identifying method 500 described with reference to FIG. 5 may complete identifying resources before receiving the request for resource release, whereas the storage system 100 might not read or write data, identified low-usage-rate-resources may be ranked. Furthermore, as indicated by the information (e.g., List_Less_Data) on low-usage-rate-resources, while releasing resources, low-usage-rate-resources may be released in an ascending order of usage rate, so as to evacuate a least amount of data.

As described above, when the information also indicates unused resources, blocks 604 and 606 should first consider determining unused resources as resources to be released.

After resources in low-usage-rate-resources (and unused resources) are released, the storage system 100 will modify the information so as to remove from the information an indication of released resources.

At block 608, the storage system 100 determines the number of low-usage-rate-resources to be released as the total number of low-usage-rate-resources. Since the number of resources to be released is greater than or equal to the total number of low-usage-rate-resources, all low-usage-rate-resources need to be released.

At block 610, the storage system 100 releases all low-usage-rate-resources. At this point, when the information also indicates unused resources, the storage system 100 needs to release all unused resources and low-usage-rate-resources.

At block 612, the storage system 100 judges whether the number of resources to be released as included in the received request is greater than the total number of resources in the specific set of resources. In response to the number of resources to be released being lower than the total number of resources in the specific set of resources, the operation process goes to block 614; otherwise, the operation process goes to block 620. It should be understood that according to some embodiments of the present disclosure, when the storage system 100 only includes one set of resources, the branch from block 620 is not required.

At block 614, the storage system 100 determines a difference number between the number of resources to be released and the total number of low-usage-rate-resources.

At block 616, the storage system 100 selects a difference number of resources from unreleased resources in the specific set of resources (i.e., resources other than all low-usage-rate-resources as released in block 610 in the specific set of resources). According to some embodiments of the present disclosure, when the difference number of resources cannot be released from the specific set of resources due to data evacuating and the like, the storage system may release a maximum number of resources from unreleased resources only.

At block 618, the storage system 100 releases the difference number of resources as selected. According to some embodiments of the present disclosure, the storage system may randomly determine resources to be released from resources other than all low-usage-rate-resources released in block 610 in the specific set of resources, so as to simplify operation. According to other embodiments of the present disclosure, at this point the storage system 100 may rank resources by usage rate other than all low-usage-rate-resources released in block 610 in the specific set of resources, so as to reduce data evacuating as much as possible.

At block 620, the storage system 100 releases all unreleased resources in the specific set of resources. Since the number of resources to be released is greater than the total number of resources in the specific set of resources, all resources in the specific set of resources need to be released, at which point unreleased resources need to be released completely.

At block 622, the storage system 100 determines a difference number between the number of resources to be released and the total number of resources in the specific set of resources.

At block 624, the storage system 100 determines a difference number of resources from at least one further set of resources. According to embodiments of the present disclosure, the step in this block is mainly directed at the circumstance in which the number of resources to be released is greater than the total number of resources in the specific set of resources. At this point, since the storage system 100 includes other set of resources, resources may be released from other set of resources so as to satisfy the request for resource release. It should be understood when resources to be released are determined from other set of resources, unused resources and low-usage-rate-resources are selected as far as possible under the idea described at various blocks. This process is the same as that described above and is not detailed here.

At block 626, the storage system 100 releases the difference number of resources as selected.

Figure 7:
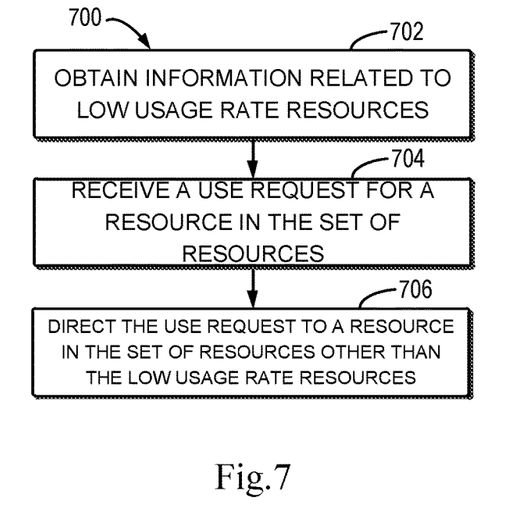
FIG. 7 shows a flowchart of a resource allocation method 700 according to embodiments of the present disclosure.

FIG. 7 shows a flowchart of the resource allocation method 700 according to embodiments of the present disclosure. It should be understood that the method 700 may further include additional steps and operations which are not shown and/or may omit steps and operations which are shown, and the scope of the present disclosure is not limited in this regard.

The method 700 starts at block 702 where the storage system 100 obtains information related to low-usage-rate-resources, the information indicating resources of a set of resources (e.g., the set of resources 110-1) in the storage system having usage rates lower than a threshold. The operation at block 702 is the same as that at block 402 in the method 400 described above and is not detailed here.

At block 704, the storage system 100 receives a use request for a resource in a specific set of resources. According to embodiments of the present disclosure, the use request may include writing data to the specific set of resources, which only requests to use a certain resource in the specific set of resources but does not limit which resource is to be used.

At block 706, the storage system 100 directs the use request to resources in the set of resources other than the low-usage-rate-resources. According to embodiments of the present disclosure, since it should be guaranteed that as many resources as possible in the set of resources have as low usage rates as possible, the storage system 100 needs to avoid resources identified as low-usage-rate-resources (including unused resources), such that these low-usage-rate-resources may be released quickly when there is a need to release resources.

Figure 8:
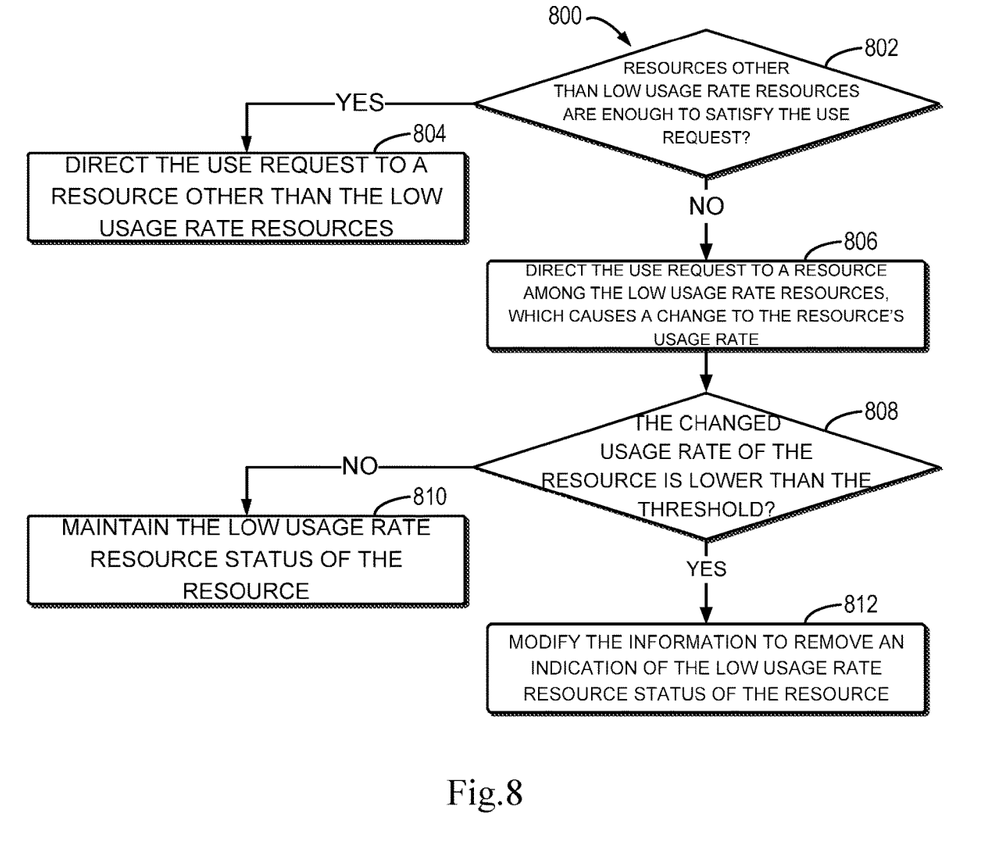
FIG. 8 shows a flowchart of a resource allocation method 800 according to other embodiments of the present disclosure.

According to some embodiments of the present disclosure, contents at block 706 in the method 700 described with reference to FIG. 7 are further refined in the form of a resource allocation method 800 shown in FIG. 8. Specifically, FIG. 8 shows a flowchart of a resource identifying method 800 according to embodiments of the present disclosure. It should be understood that the method 800 may further include additional steps and operations which are not shown and/or may omit steps and operations which are shown, and the scope of the present disclosure is not limited in this regard.

The method 800 starts at block 802 where the storage system 100 judges whether resources in the set of resources other than low-usage-rate-resources are sufficient to satisfy the use request. In response to resources in the set of resources other than low-usage-rate-resources being sufficient to satisfy the use request, the operation process goes to block 804; otherwise, the operation process goes to block 806.

At block 804, since it is decided that resources in the set of resources other than low-usage-rate-resources are sufficient to satisfy the use request, the storage system 100 directs the use request to a resource other than low-usage-rate-resources, i.e., normal resources. At this point, low-usage-rate-resources will not be affected.

At block 806, since it is decided that resources in the set of resources other than low-usage-rate-resources are insufficient to satisfy the use request, low-usage-rate-resources are needed, the storage system 100 directs the use request to a resource among low-usage-rate-resources, and the resource rate is changed. According to some embodiments of the present disclosure, when a resource among low-usage-rate-resources is required to satisfy the use request, a number of resources satisfying the request may be randomly selected from low-usage-rate-resources. According to other embodiments of the present disclosure, when a resource among low-usage-rate-resources is required to satisfy the use request, resources with higher resource usage rates among low-usage-rate-resources may be used first. When releasing these resources, more data need to be evacuated, so they are made no longer low-usage-rate-resources in this manner.

According to embodiments of the present disclosure, when the information indicates both unused resources and low-usage-rate-resources having usage rates that are not zero, the use priority of low-usage-rate-resources having usage rates that are not zero is higher than the use priority of unused resources, i.e., the use of unused resources is avoided as far as possible.

At block 808, the storage system 100 judges whether the changed usage rate of the resource at block 806 is lower than the threshold. In response to the changed usage rate being lower than the threshold, the operation process goes to block 810; otherwise, the operation process goes to block 812. Once the usage rate of a low usage rate resource increases and is no longer lower than the threshold, the resource cannot be used as a low usage rate resource but should be adjusted.

At block 810, since the changed usage rate of the resource is still lower than the threshold, the storage system 100 maintains the status of the resource as a low usage rate resource. It should be noted that if the resource's usage rate before the change is zero, i.e., the resource is an unused resource, and the information indicates unused resources and low-usage-rate-resources, then the information needs to be modified so as to change the status of the resource from an unused resource to a low usage rate resource. According to embodiments of the present disclosure, this may be effected by extracting the resource from List_No_Data and adding the resource to List_Less_Data.

At block 812, the storage system modifies the information to remove the indication of low usage rate resource status of the resource. According to embodiments of the present disclosure, no matter whether the resource is an unused resource in List_No_Data or a low usage rate resource in List_Less_Data before use, the indication of low usage rate resource status of the resource may be removed by extracting the resource from a corresponding list.

As seen from the above description with reference to FIGS. 1 to 8, the technical solution according to embodiments of the present disclosure has many advantages over the traditional solution. In the traditional solution, a usage rate of each resource of a set of resources needs to be checked and ranked every time a resource is released, and a usage rate of each resource in a current set of resources is not considered during resource allocation. Therefore, the traditional solution has problems such as time consumption, increase of the amount of moved data and system overheads, which can be overcome by means of the technical solution (e.g., specialized circuitry) according to embodiments of the present disclosure. In the traditional solution, a resource might be allocated from resources with smaller resource usage rates, so data may be equally allocated to many resources and a large amount of data need to be moved in resource release. In particular, after multiple snapshots are deleted, some slices contain very few data. In the traditional solution, these slices will still be used for resource allocation. In comparison, the technical solution provided by embodiments of the present disclosure marks resources with smaller resource usage rates to avoid using (allocating) these resources, such that only a small amount of data need to be moved when releasing these resources. In addition, when resources with zero usage rates are generated due to deletion of multiple snapshots, no data need to be moved when releasing resources. Therefore, not only the time and computing overheads for checking each resource in resource release may be reduced, but also the amount of moved data for resource release may be decreased.

Figure 9:
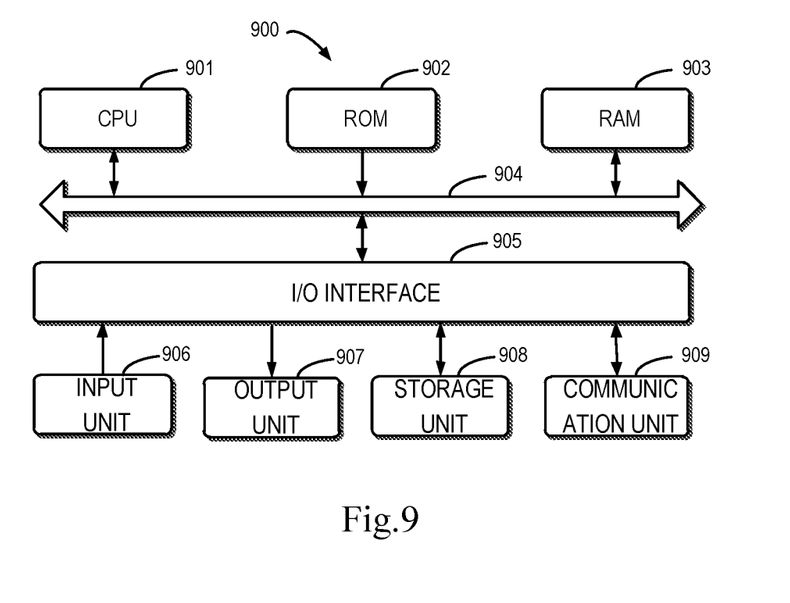
FIG. 9 shows a schematic block diagram of an example device 900 that is applicable to implement embodiments of the present disclosure.

FIG. 9 shows a schematic block diagram of an example device 900 suitable for implementing embodiments of the present disclosure. As depicted, the device 900 includes a central processing unit (CPU) 901 that is capable of performing various appropriate actions and processes in accordance with computer program instructions stored in a read only memory (ROM) 902 or computer program instructions loaded from a storage unit 908 to a random access memory (RAM) 903. In the RAM 903, there are also stored various programs and data required by the device 900 when operating. The CPU 901, the ROM 902, and the RAM 903 are connected to one another via a bus 904. An input/output (I/O) interface 905 is also connected to the bus 904.

Multiple components in the device 900 are connected to the I/O interface 905: an input unit 906 including a keyboard, a mouse, or the like; an output unit 907, such as various types of displays, a loudspeaker or the like; a storage unit 908, such as a disk, an optical disk or the like; and a communication unit 909, such as a LAN card, a modem, a wireless communication transceiver or the like. The communication unit 909 allows the device 900 to exchange information/data with other device via a computer network, such as the Internet, and/or various telecommunication networks.

The above-described procedures and processes, such as the methods 400, 500, 600, 700, and 800 may be executed by the processing unit 901. For example, in some embodiments, the methods 400, 500, 600, 700, and 800 may be implemented as a computer software program that is tangibly embodied on a machine readable medium, e.g., the storage unit 908. In some embodiments, part or the entirety of the computer program may be loaded to and/or installed on the device 900 via the ROM 902 and/or the communication unit 909. The computer program, when loaded to the RAM 903 and executed by the CPU 901, may execute one or more acts of the methods 400, 500, 600, 700, and 800 as described above.

The present disclosure may be a method, an apparatus, a system, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to embodiments disclosed. Many modifications and variations will be apparent to those of ordinary skill in the art without departing from the scope and spirit of the described embodiments. The terminology used herein was chosen to best explain the principles of embodiments, the practical application or technical improvement over technologies found in the marketplace, or to enable others of ordinary skill in the art to understand embodiments disclosed herein.

I claim:

1. A method of storage resource release, comprising:
   identifying resource states for multiple data slices, the resource states including a normal state, a marked state, an unused state, a data evacuating state, and a data evacuated state, the normal state being identified for data slices being user accessible without restriction, the marked state being identified for data slices in the normal state being selected as candidates for release, the unused state being identified for data slices having storage space usage rates of zero, the data evacuating state being identified for data slices with data being evacuated, and the data evacuated state being identified for data slices with data having been completely evacuated;

in response to initiation of a resource deallocation operation, converting one or more first data slices from the normal state to the unused state;

in response to one or more remaining data slices in the normal state being insufficient to satisfy IO requests and data slices in the marked state or the data evacuating state having no allocatable storage space, converting one or more second data slices from the unused state to the normal state; and in response to initiation of a resource release operation, reducing an amount of data slices in the normal state being selected as candidates for release by converting one or more third data slices from the unused state to the data evacuated state.

2. The method according to claim 1, wherein the multiple data slices include a number of unused data slices, and wherein the method further comprises:

generating information based on the number of unused data slices;

in response to a specified number of data slices to be released being lower than or equal to the number of unused data slices, releasing the specified number of the unused data slices; and removing from the information an indication of the released specified number of the unused data slices.

3. The method according to claim 1, wherein the multiple data slices include a number of unused data slices, and wherein the method further comprises:

generating information based on the number of unused data slices, in response to a specified number of data slices to be released being greater than the number of unused data slices, releasing all of the unused data slices; and removing from the information an indication of the released unused data slices.

4. The method according to claim 3, further comprising:

determining a difference number between the specified number of data slices to be released and the number of unused data slices;

selecting the difference number of data slices from unreleased data slices from among the multiple data slices; and releasing the selected difference number of data slices.

5. The method according to claim 1, wherein the multiple data slices include a number of unused data slices, and wherein the method further comprises:

generating information based on the number of unused data slices;

in response to a specified number of data slices to be released being greater than a total number of the multiple data slices, releasing all of the unused data slices; and removing from the information an indication of the released unused data slices.

6. The method according to claim 1, wherein the data slices selected as candidates for release are selected in an ascending order of usage rates.

7. The method of claim 1 further comprising:

releasing the one or more third data slices in the data evacuated state.

8. A storage resource allocation device, comprising:

at least one processing unit; and at least one memory coupled to the at least one processing unit and storing instructions to be executed by the at least one processing unit, the instructions, when being executed by the at least one processing unit, causing the device to perform acts comprising:

identifying resource states for multiple data slices, the resource states including a normal state, a marked state, an unused state, a data evacuating state, and a data evacuated state, the normal state being identified for data slices being user accessible without restriction, the marked state being identified for data slices in the normal state being selected as candidates for release, the unused state being identified for data slices having storage space usage rates of zero, the data evacuating state being identified for data slices with data being evacuated, and the data evacuated state being identified for data slices with data having been completely evacuated;

in response to initiation of a resource deallocation operation, converting one or more first data slices from the normal state to the unused state;

in response to one or more remaining data slices in the normal state being insufficient to satisfy IO requests and data slices in the marked state or the data evacuating state having no allocatable storage space, converting one or more second data slices from the unused state to the normal state; and in response to initiation of a resource release operation, reducing an amount of data slices in the normal state being selected as candidates for release by converting one or more third data slices from the unused state to the data evacuated state.

9. A computer program product having a non-transitory computer readable medium which stores a set of instructions to perform storage resource release, the set of instructions, when carried out by computerized circuitry, causing the computerized circuitry to perform a method of:

identifying resource states for multiple data slices, the resource states including a normal state, a marked state, an unused state, a data evacuating state, and a data evacuated state, the normal state being identified for data slices being user accessible without restriction, the marked state being identified for data slices in the normal state being selected as candidates for release, the unused state being identified for data slices having storage space usage rates of zero, the data evacuating state being identified for data slices with data being evacuated, and the data evacuated state being identified for data slices with data having been completely evacuated;

in response to initiation of a resource deallocation operation, converting one or more first data slices from the normal state to the unused state;

in response to one or more remaining data slices in the normal state being insufficient to satisfy IO requests and data slices in the marked state or the data evacuating state having no allocatable storage space, converting one or more second data slices from the unused state to the normal state; and in response to initiation of a resource release operation, reducing an amount of data slices in the normal state being selected as candidates for release by converting one or more third data slices from the unused state to the data evacuated state.

\* \* \* \* \*